United States Patent [19]
McLemore

[11] Patent Number: 5,526,927
[45] Date of Patent: Jun. 18, 1996

[54] TACKLE BOX WITH MAGNETICALLY ATTRACTIVE PANES

[76] Inventor: Billy M. McLemore, 1343 E. Massey Rd., Memphis, Tenn. 38120

[21] Appl. No.: 324,597

[22] Filed: Oct. 18, 1994

[51] Int. Cl.⁶ .................................................. B65D 85/00
[52] U.S. Cl. ................................. 206/315.110; 206/818
[58] Field of Search ..................................... 206/372, 373, 206/315.11, 818; 43/57.1

[56] References Cited

U.S. PATENT DOCUMENTS

| | | |
|---|---|---|
| 866,408 | 9/1907 | Vanderbilt . |
| 2,540,340 | 2/1951 | Linblade . |
| 2,597,601 | 5/1952 | Sherman . |
| 2,693,654 | 11/1954 | Clark . |
| 2,999,621 | 9/1961 | Kiser . |
| 3,141,258 | 7/1964 | Mayer .................................... 206/818 |
| 3,151,790 | 10/1964 | Mavrakis . |
| 3,680,750 | 8/1972 | Franco . |
| 4,697,379 | 10/1987 | McPhaul . |
| 4,826,059 | 5/1989 | Bosch et al. . |
| 4,942,691 | 7/1990 | Hwang . |
| 4,970,821 | 11/1990 | Young . |
| 5,079,863 | 1/1992 | Gillespie ............................ 206/315.11 |
| 5,185,952 | 2/1993 | Bruce ................................. 206/315.11 |

OTHER PUBLICATIONS

Advertising Brochure—Tangle Proof Tackle Box, O & S Mfg./Willie Products Division, Brookfield, WI.

*Primary Examiner*—Thomas P. Hilliard
*Attorney, Agent, or Firm*—Baker, Donelson, Bearman & Caldwell

[57] ABSTRACT

An improved tackle box for storing and transporting lures, particularly crank bait and stick bait, comprising a case having a magnetically attractive panel disposed therein. Removable hook receptacles are secured to the lures and have magnets disposed thereon for suspending the lures from the magnetically attractive panel. In the preferred embodiment, the case includes a pair of hinged lids covering opposed open sides, with each side and each lid having a magnetically attractive panel disposed therein. Additional containers for storing other items of tackle may also be magnetically secured to the panels. A plurality of lures may be selected by the user and temporarily secured to the exterior of the case for convenient access while fishing.

4 Claims, 3 Drawing Sheets

TACKLE BOX WITH MAGNETICALLY ATTRACTIVE PANES

BACKGROUND OF THE INVENTION

1. Field

The present invention relates to tackle boxes and, more particularly, to tackle boxes specifically designed to store large lures commonly referred to as crank bait.

2. Description of the Prior Art

Tackle boxes are commonly used by fisherman to store and carry their weights, hooks, lures and related items of tackle. Conventional tackle boxes typically include a plurality of trays, each of which will hold one or more items. Larger lures, such as those referred to as "crank bait" and "stick bait" which are becoming increasingly popular, present a problem with conventional tackle boxes due to their size. Also, since such lures typically include a plurality of hook clusters known as treble hooks, problems arise when two or more lures are kept in the same compartment since the hooks tend to become entangled.

In response to the increasing popularity of crank baits and the above mentioned problem, new tackle boxes have been designed specifically for use with such lures. In one tackle box currently on the market, the lures are suspended by springs between a pair of horizontal bars, with the springs secured to each end of the lures to keep them in a vertical position, thereby avoiding excessive entanglement between lures. This system has been found to be inordinately complicated and expensive due to the numerous springs which must be employed. Furthermore, the hooks on adjacent lures still become entangled, even though they are suspended between springs. Additionally, such tackle boxes are only suitable for use with crank baits and similarly configured lures, having no provision for storing hooks, weights, and other items of tackle.

A need has been recognized for a new type of tackle box which is particularly well suited for storing and carrying crank bait and similar lures, and may also be used with virtually any conventional item of tackle.

BRIEF SUMMARY OF THE INVENTION

It is an object of the present invention to provide a tackle box specially adapted for storing crank bait in a manner which prevents entanglement between a plurality of lures.

It is a further object to provide such a tackle box which may also be used for storing other types of tackle, such as weights, hooks, floats, etc.

A still further object is to provide a tackle box which stores crank bait in a convenient manner, and allows ready access to the lures by a fisherman.

Another object is to provide a tackle box which may be used by a fisherman to secure additional lures when the box is closed.

These and other objects are achieved in the present invention, which comprises an apparatus for storing fishing lures, each lure having a body and a plurality of hooks depending therefrom, wherein the apparatus comprises a first panel, a plurality of hook receptacles removably securable to the hooks, and retaining means for removably securing the receptacles to the panel. In the preferred embodiment, the panel is magnetically attractive and the retaining means comprises a magnet secured to each receptacle. Upon securing the receptacles to the hooks of a typical crank bait lure and affixing the receptacles to the panel, a plurality of lures may be conveniently stored suspended from the panel in a manner which prevents the lures from becoming entangled. A plurality of panels are preferably included in a case having two opposing sides, each side having a lid which may be opened to expose the lures contained therein. A plurality of individual containers may also be included, each having retaining means associated therewith for securing the containers to the panel, wherein the containers may be utilized to store hooks, weights, and other items of tackle.

The above stated and other objects will become apparent to those skilled in the art upon reading the following detailed description, taken in conjunction with the appended drawings.

DETAILED DESCRIPTION OF THE PREFERRED EMBODIMENT

Figure 1:
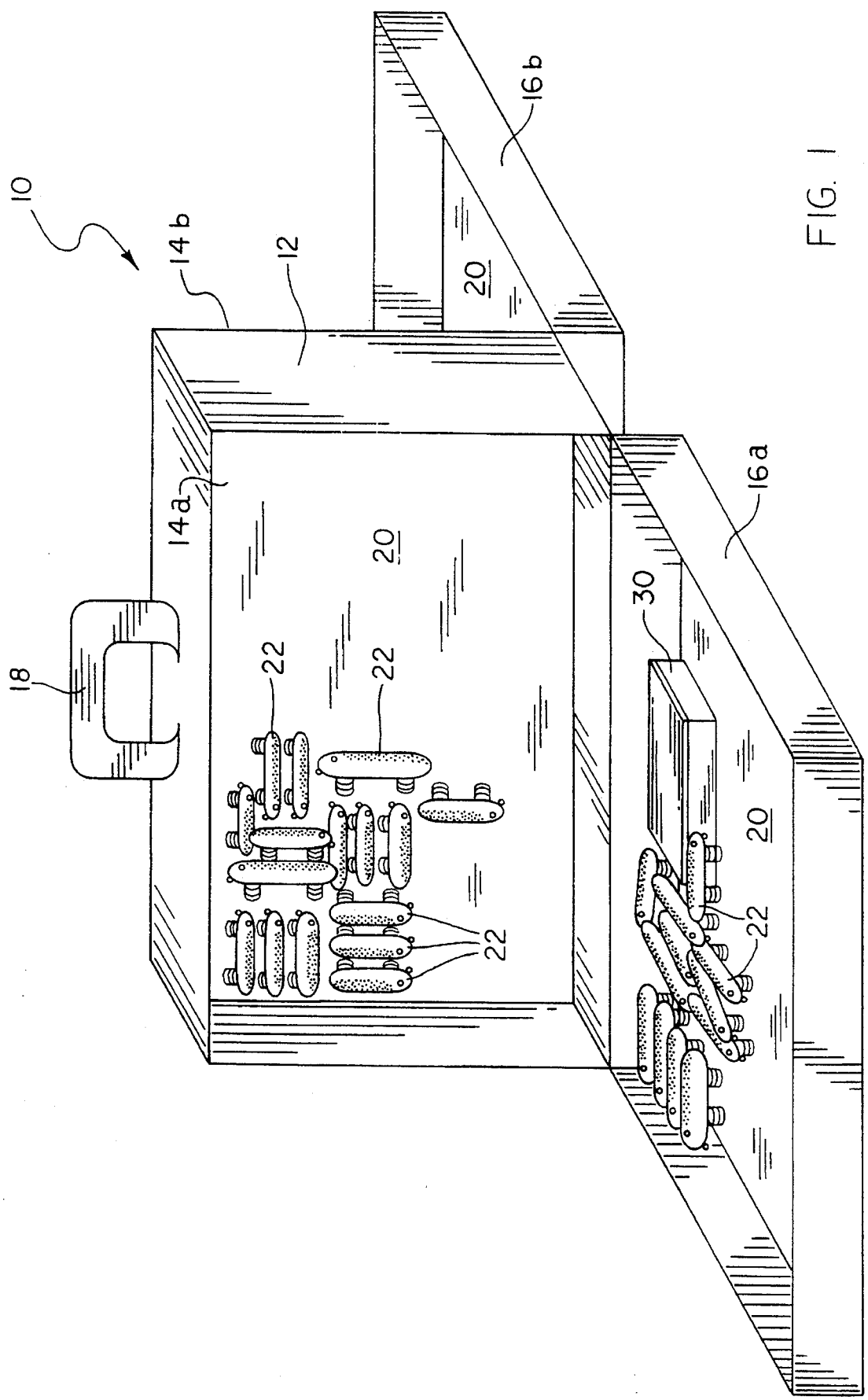
FIG. 1 is a top, side perspective view of the tackle box of the present invention, shown with both sides open.

Referring initially to FIG. 1, the tackle box of the present invention is illustrated as storing apparatus 10, comprising a portable case having a central frame portion 12, and a pair of opposed open sides 14a and 14b with lids 16a and 16b hingedly secured thereto. A handle 18 is operatively secured to the top edge of frame 12 so that the user may easily carry apparatus 10 from one location to another. Also secured to the top edge of frame 12, but not shown herein, are a pair of latches for securing lids 16a and 16b in their closed positions covering sides 14a and 14b, respectively. The placement and configuration of the latches are purely conventional, and will be readily known to those skilled in the art. Additionally, it is to be understood that the configuration of side 14b, while not shown directly in FIG. 1, is essentially identical to side 14a in the preferred embodiment of apparatus 10. It will also be appreciated that one side may be modified as desired, or even omitted altogether so that apparatus 10 only includes one open side, without departing from the spirit and scope of this invention.

Figure 2:
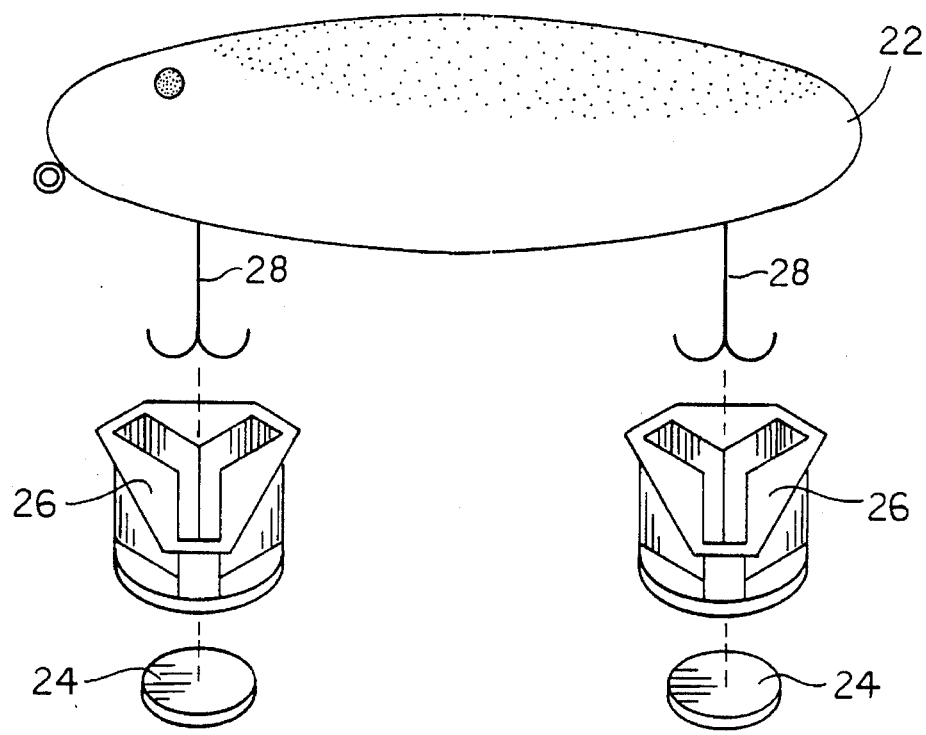
FIG. 2 is a side perspective view of a typical crank bait lure, including an exploded view of the hook retainers and their respective magnets.

Sides 14 and lids 16 define a plurality of recessed compartments, each having a magnetically attractive panel 20 secured therein. Frame 12 and lids 16a and 16b are preferably formed from a suitably durable plastic material to minimize the weight of apparatus 10, while panels 20 are formed from steel. Panels 20, being magnetically attractive, enable a plurality of lures 22 to be stored within apparatus 10 by means of magnets 24. With reference now to FIG. 2, it is seen that magnets 24 are affixed to the bottom surface of conventional hook covers 26, which serve as receptacles for receiving and grippingly engaging treble hooks 28. With its hooks 28 secured within hook covers 26, and with magnets 24 fixedly secured to covers 26, a lure 22 may be placed virtually anywhere within the confines of apparatus 10 and it will be adequately secured for storing and transit and will not become entangled with other lures so long as its respective magnets 24 are secured to a panel 20. In the embodiment shown, it is expected that magnets 24 may be secured to the bottom of hook covers 26 by a suitable adhesive, but it is also contemplated that magnets 24 may be permanently embedded within covers 26 or other suitable hook receptacles, or that the receptacles themselves may be magnetized. Hook covers 26 and magnets 24 were selected for purposes of this embodiment simply because they are conventional components which are both readily obtainable and inexpensive.

Figure 3:
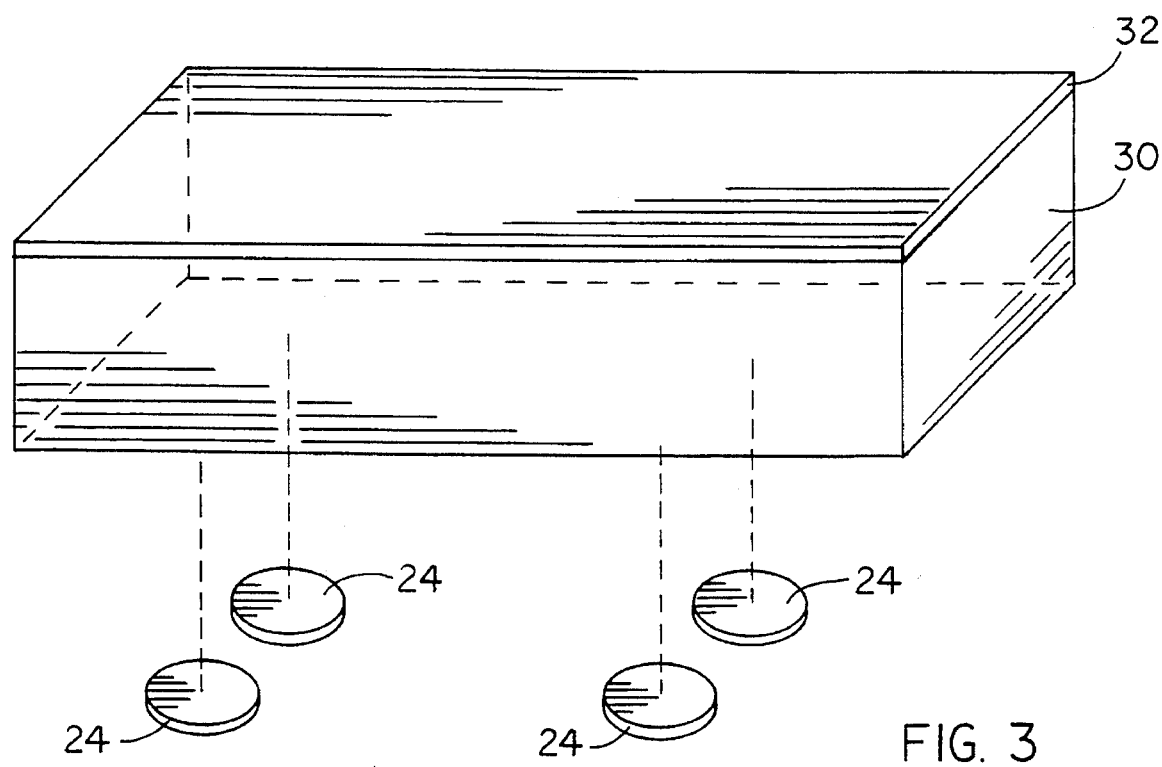
FIG. 3 is a top, side perspective view of a container for use in the tackle box shown in FIG. 1, with an exploded view of the magnets associated with the container.
Figure 4:
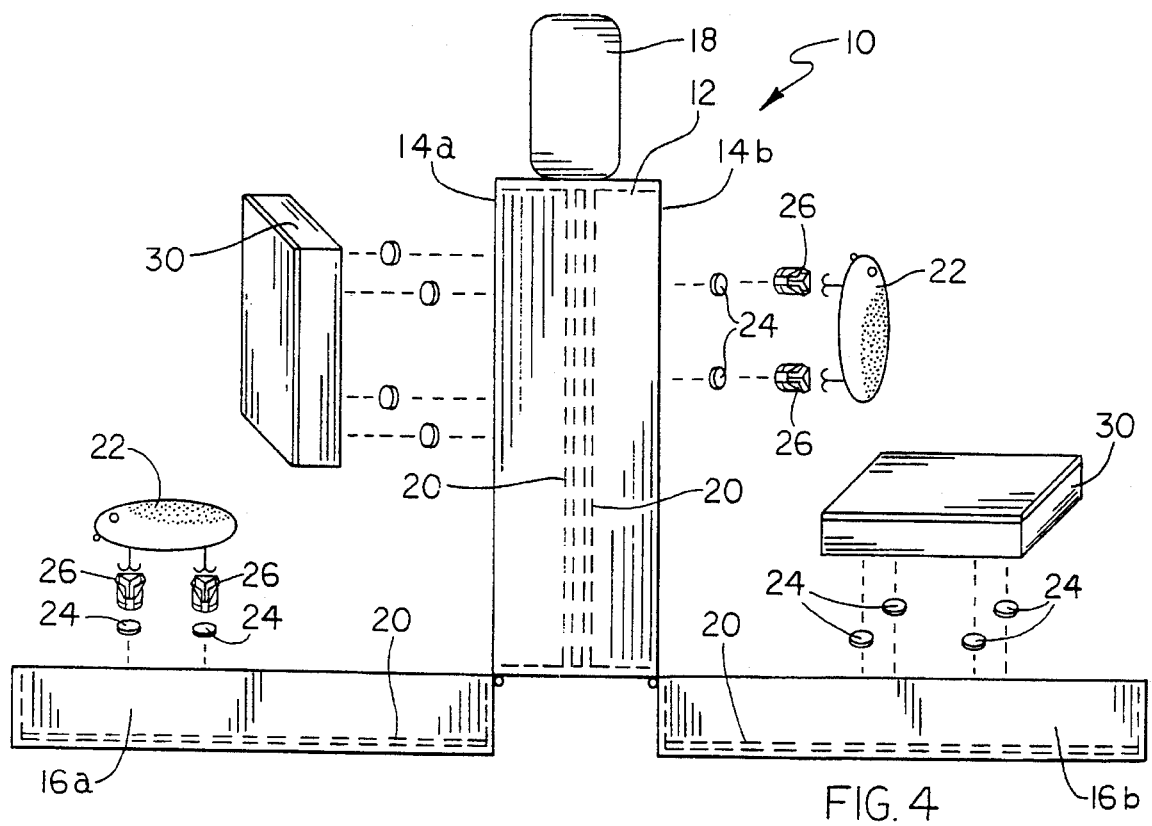
FIG. 4 is a side view of the tackle box shown in FIG. 1, including exploded views of a pair of lures and containers.

FIG. 3 illustrates a container 30 having a removable lid 32, which may also be secured within apparatus 10 by affixing magnets 24 to the underside thereof. A plurality of containers 30 may be included within apparatus 10 for storing hooks, weights, floats, or any other items of fishing tackle desired by the user. While apparatus 10 was designed primarily to facilitate the storage and transportation of crank bait and stick bait depicted generally as lures 22, apparatus 10 is a versatile tackle box which may be utilized for carrying other items used by a fisherman as well. The use of panels 20 and magnets 24 for securing lures 22 and containers 30 within apparatus 10 creates an unusually high degree of adaptability which has been previously unknown in the art of fishing tackle boxes.

Figure 5:
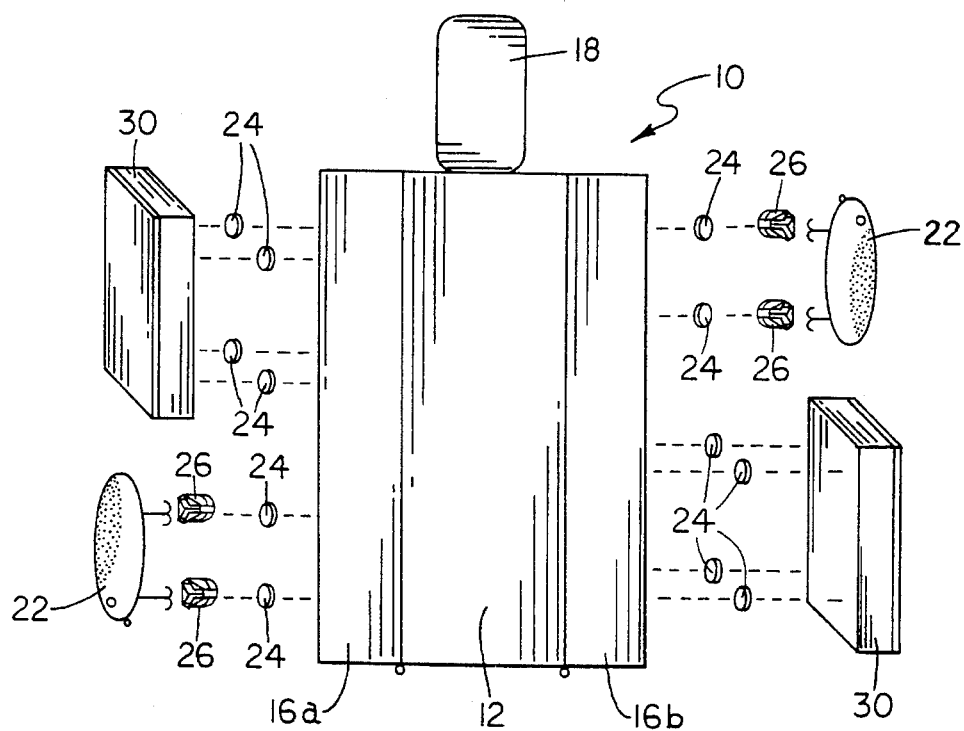
FIG. 5 is an end elevational view of the tackle box indicating the attachment of lures and containers to the exterior surface thereof.

A further example of the versatility of apparatus 10 is shown in FIG. 5. In many instances, a fisherman may wish to select two or more lures for alternate use while fishing. With conventional tackle boxes, additional lures must be placed somewhere within the fisherman's reach, typically on the seat or floor of the boat where they are prone to getting lost, damaged, or entangled with other gear. With apparatus 10, however, this problem is solved. The magnetic attraction of panels 20 disposed within lids 16a and 16b is sufficiently strong to attract magnets 24 through the surface of lids 16a and 16b. Therefore, additional lures 22 and/or containers 30 may be temporarily secured to the exterior surface of lids 16a and/or 16b for ready access by the fisherman. The attraction of magnets 24 to panels 20 through either lid 16a or 16b prevents lures 22 and containers 30 from falling off into the bottom of the boat. When a lure 22 is in use, the hook covers 26 and their respective magnets 24 may be conveniently stored on the exterior surface of apparatus 10 in the same manner, or may be secured directly to a panel 20 on the interior of apparatus 10.

While the principles of providing an improved storage apparatus having a panel disposed therein for retaining fishing lures and related tackle utilizing magnetic retaining means has been made clear from the foregoing detailed description, it is to be understood that numerous modifications may be made in the preferred embodiment without department from the spirit and scope of this invention. In particular, it is expected that the configuration of hook covers 26 and magnets 24 may be modified, and that retaining means other than magnets may be employed (i.e., hook and loop fastening materials may be used). Accordingly, the spirit and scope of this invention is to be limited only by the following claims and their equivalents.

What is claimed is:

1. Apparatus for storing a plurality of fishing lures, each said lure having a body and a plurality of hooks depending therefrom, said apparatus comprising:

a case comprising a frame member having first and second open sides and first and second doors hingedly secured thereto, respectively, said first and second doors being independently moveable between open and closed positions and securable in said closed positions;

first and second magnetically attractive panels respectively mounted on an inside surface of said first and second doors;

a plurality of hook receptacles for operatively engaging at least one of said plurality of hooks depending from said plurality of fishing lures; and a plurality of magnets, attached to said plurality of hook receptacles, for removably and selectively securing said receptacles to said first and second magnetically attractive panels thereby allowing said plurality of fishing lures to be suspended therefrom, said first and second doors respectively allowing direct access to said first and second panels when in said open positions, said plurality of magnets having sufficient strength to attract said first and second panels through said first and second doors wherein said plurality of hook receptacles may be magnetically attached to an exterior surface of said first and second doors thereby allowing said plurality of fishing lures to be suspended therefrom.

2. Storing apparatus as set forth in claim 1, further comprising:

third and fourth magnetically attractive panels respectively mounted within said first and second open sides of said frame member for operatively engaging said plurality of hook receptacles and magnets thereby allowing said plurality of fishing lures to be suspended therefrom, said first and second doors substantially covering said third and fourth panels, respectively, in said closed positions and respectively allowing direct access to said third and fourth panels through said first and second open sides in said open positions.

3. Apparatus for storing a plurality of fishing lures and other tackle, each said lure having a body and a plurality of hooks depending therefrom, said apparatus comprising:

a case comprising a frame member having first and second open sides and first and second doors hingedly secured thereto, respectively, said first and second doors being independently moveable between open and closed positions and securable in said closed positions;

first and second magnetically attractive panels respectively mounted on an inside surface of said first and second doors;

a plurality of hook receptacles for operatively engaging at least one of said plurality of hooks depending from said plurality of fishing lures;

a plurality of containers for receiving and holding said other tackle; and a plurality of magnets, attached to said plurality of hook receptacles and to an underside portion of said plurality of containers, for removably and selectively securing said plurality of receptacles and containers to said first and second magnetically attractive panels thereby allowing said plurality of fishing lures and containers to be suspended therefrom, said first and second doors allowing direct access to said first and second panels when in said open positions, said plurality of magnets having sufficient strength to attract said first and second panels through said first and second doors wherein said plurality of hook receptacles and containers may be magnetically attached to an exterior surface of said first and second doors thereby allowing said plurality of fishing lures and containers to be suspended therefrom.

4. Storing apparatus as set forth in claim 3, further comprising:
third and fourth magnetically attractive panels respectively mounted within said first and second open sides of said frame member for operatively engaging said plurality of hook receptacles and containers thereby allowing said plurality of fishing lures and containers to be suspended therefrom, said first and second doors substantially covering said third and fourth panels, respectively, in said closed positions and respectively allowing direct access to said third and fourth panels through said first and second open sides in said open positions.

* * * * *